May 26, 1942.     F. J. WESTROPE     2,284,502
VISOR SUPPORT
Filed April 26, 1941

Inventor
Frederick J. Westrope
By
Attorneys

Patented May 26, 1942

2,284,502

UNITED STATES PATENT OFFICE 2,284,502

VISOR SUPPORT

Frederick J. Westrope, Pleasant Ridge, Mich., assignor, by mesne assignments, to Reconstruction Finance Corporation, Detroit, Mich., a corporation of the United States Application April 26, 1941, Serial No. 390,579

6 Claims. (Cl. 248—289)

This invention relates to visors or glare shields for vehicles and in particular to brackets for supporting such visors or glare shields.

One object of this invention is to provide a visor support adapted for inexpensive and rapid production and assembly, preferably by the use of stampings for a portion thereof.

Another object is to provide a supporting structure for a glare shield or visor having a supporting rod with a conical end seated in a conical bore in a plug held by a stamped or molded base.

Another object is to provide a visor-supporting structure as set forth in the preceding object wherein the bored plug is serrated and engages corresponding serrations in the base member.

Another object is to provide a visor-supporting structure as set forth in the preceding objects wherein the bored plug is serrated and inserted in corresponding serrations in the base member, after which the projecting end of the plug is upset by a spinning operation to firmly unite the plug to the base member.

In general, the visor support of this invention consists of a rod for supporting the visor or glare shield having a conical bent end inserted in a corresponding conical bore and urged into frictional contact therewith by a coil spring mounted on the end of the rod. The conical bore is formed in a plug having a serrated end formed with straight knurling and inserted in a correspondingly serrated aperture in a base member adapted for attachment to the vehicle. After the serrated or knurled portion of the plug has been inserted into the serrated aperture, the exposed end of the plug is then upset by a spinning operation so as to unite the plug firmly with the base member. The base member is preferably a stamping and the interlocking serrations between it and the plug prevent the rotation of the plug under the torque applied by swinging the rod. At the same time, moreover, this contruction provides a cheap visor support which is durable and efficient, yet which can be easily produced under mass production conditions.

Figure 1:
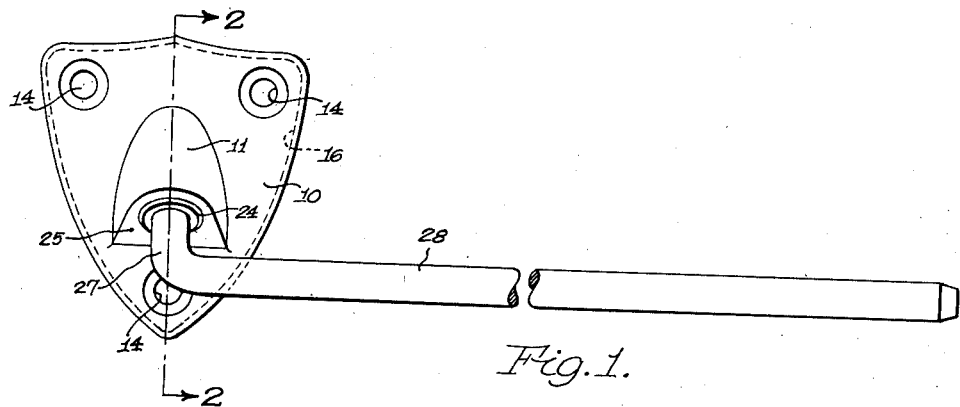
Figure 1 is a front elevation of a preferred embodiment of the visor support of this invention.
Figure 2:
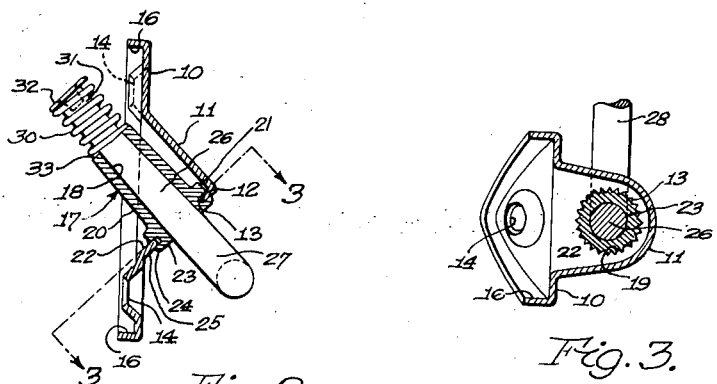
Figure 2 is a vertical section along the line 2—2 in Figure 1.
Figure 3:
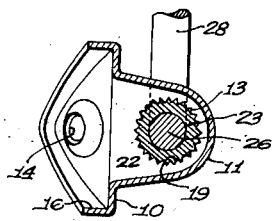
Figure 3 is an oblique cross section along the line 3—3 in Figure 2.

Referring to the drawing in detail, Figure 1 shows a visor support according to the invention as consisting of a base member 10, preferably a stamping, and having an angularly projecting portion 11 provided with a hole or aperture 12 formed with serrations 13. The base member 10 is also provided with holes 14 for the insertion of screws for attaching the device to a vehicle. The inner surface 15 of the base member 10 is countersunk to provide an edge flange 16.

Mounted in the projecting portion 11 of the base member 10 is a plug 17 having a conical bore 18 and a serrated end 19 inserted in the serrated aperture 12. Between the serrated portion 19 and the body 20 of the plug 17 is a flange or annular shoulder 21 which solidly engages and abuts the inner surface 22 of the projecting portion 11 surrounding the serrated aperture 12. The plug 17 is secured within the serrated aperture 12 by upsetting the free end 23 of the plug 20 in order to provide an enlarged head 24 engaging the outer surface 25 of the projecting portion 11 surrounding the serrated aperture 12.

Figure 6:
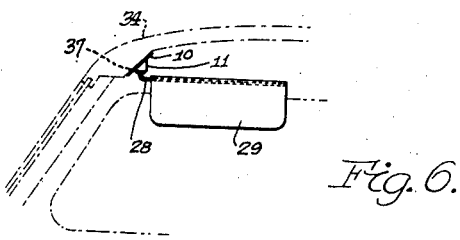
Figure 6 is a side elevation of the complete visor or glare shield installed in a vehicle and employing the visor support of the present invention.

Mounted in and engaging the conical bore 18 in the plug 17 is the correspondingly conical portion 26 of the bent end 27 of the visor supporting rod 28 upon which the visor or glare shield 29 is mounted (Figure 6). Beyond the conical portion 26 is mounted a coil spring 30 surrounding the end extension 31 which terminates in an upset or enlarged head 32 forming an abutment for the coil spring 30. The opposite end of the coil spring 30 engages the end 33 of the plug 17.

Figure 4:
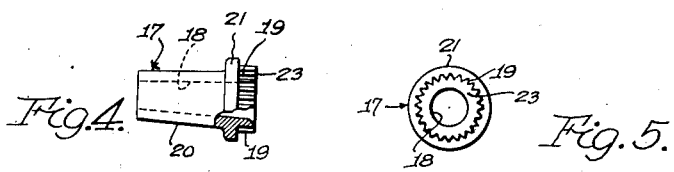
Figure 4 is a side elevation, partly in section, of the conically bored plug prior to its insertion in the base member.
Figure 5:
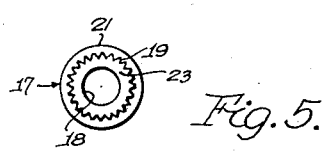
Figure 5 is a right-hand end elevation of Figure 4.

In assembling the visor support of this invention, the conical portion 26 of the bent end 27 of the visor-supporting rod 28 is inserted within the conical bore 18 in the plug 17, which at this stage of manufacture has the appearance shown in Figures 4 and 5. The coil spring 30 is then mounted upon the end extension 31, after which the latter is upset as at 32 to provide a head and abutment for the spring 30, as well as to retain the parts in assembly.

The serrated or knurled portion 19 of the plug 17 and the rod 28 secured therein are then inserted through the serrated aperture 12 with the corresponding serrations 13 and 19 in mutual engagement. The free end 23 of the plug 17 is then upset as at 24 by a spinning operation in order to firmly unit the plug 17 with the base portion 10.

Optionally, in assembly, the order of the foregoing steps may be altered by first inserting the plug 17 in the serrated aperture 12 and then upsetting the free end 23 by a spinning operation in order to firmly secure the plug 17 to the base member 10. The conical portion 26 of the visor-supporting rod 28 may then be inserted in the conical bore 18, the coil spring 30 then mounted upon the end extension 15, and the extremity of the latter upset as at 32 in order to hold the spring 30 in its assembled position. The visor support of Figure 1 thus assembled may be provided with any suitable type of visor or glare shield 29, as shown in Figure 6, the details thereof forming no part of the present invention.

In operation, the supporting member 10 occupies the position relatively to the vehicle top 34 (Figure 6) by being secured to the inner forward surface 37 thereof. The visor 29 may be swung around the axis of the conical bore 18, as the operator desires, merely by taking hold of it and swinging it manually. When the device has been swung into the desired position, the coil spring 30 causes such frictional engagement between the conical portion 26 of the rod 28 and the conical bore 18 in the plug 17 as to hold the rod 28 and visor 29 in its adjusted position by means of friction. As the interengaging conical surfaces 18 and 26 are of relatively large area, the friction existing between them is sufficient to hold the visor 29 in position in spite of the jolting or vibration of the vehicle. The visor 29 is ordinarily provided with means for holding it in an adjusted position around the axis of the rod 28, usually also by friction. Occasionally also, the visor or glare shield 29 and the supporting rod 28 are constructed so as to permit the visor 29 to be slid axially along the rod 28 so as to enable the visor 29 to be placed in the most desirable position.

The provision of the stamped base member 10 and the serrated plug 17 gives a construction which is well adapted to mass production and assembly. As the parts of the device are inexpensive to make, the cost of the entire assembly is kept at a very low figure. The device, however, is of rugged construction and accordingly has a working life as long as or longer than the automobile or other vehicle in which it is placed.

While a specific embodiment of the invention has been described and illustrated, it will be understood that various modifications may be made within the scope of the appended claims without departing from the spirit of the invention.

What I claim is:

1. In a visor-supporting structure, a base member having a serrated aperture, a holding member with a conical bore having a serrated portion engaging said aperture, and a visor-supporting rod having a conical portion engaging said conical bore.

2. In a visor-supporting structure, a base member having a serrated aperture, a holding member with a conical bore having a serrated portion engaging said aperture, and a visor-supporting rod having a conical portion engaging said conical bore, said holding member having a projection engaging said base member adjacent said aperture.

3. In a visor-supporting structure, a base member having a serrated aperture, a holding member with a conical bore having a serrated portion engaging said aperture, and a visor-supporting rod having a conical portion engaging said conical bore, said holding member having a projection engaging said base member adjacent said aperture, the free end of said holding member beyond said aperture being enlarged whereby to secure said holding member to said base member.

4. In a visor-supporting structure, a base member having an inclined projection containing a serrated aperture, an elongated holding member with a conical bore having a serrated portion engaging said aperture, and a visor-supporting rod having a conical portion engaging said conical bore.

5. In a visor-supporting structure, a base member having an aperture, a holding member inserted in said aperture and having a conical bore, said base member and said holding member having interengaging means therebetween for preventing relative rotation thereof, means for securing said members in assembly, and a visor supporting element with a conical portion engaging said conical bore.

6. A bracket for a visor comprising a base member having a serrated aperture and a holding member having a correspondingly serrated portion inserted in said aperture and having a conical bore therein.

FREDERICK J. WESTROPE.